United States Patent [19]

Wakabayashi et al.

[11] 4,407,573
[45] Oct. 4, 1983

[54] POP UP FLASH DEVICE CONTROL FOR A CAMERA

[75] Inventors: Hiroshi Wakabayashi, Yokohama; Kazuyuki Kazami, Tokyo; Yoshiaki Ohtsubo, Kawasaki; Shigeo Akasaka, Kodaira, all of Japan

[73] Assignee: Nippon Kogaku K.K., Tokyo, Japan

[21] Appl. No.: 266,103

[22] Filed: May 21, 1981

[30] Foreign Application Priority Data

Jun. 5, 1980 [JP] Japan .............................. 55-77298[U]
Jun. 8, 1980 [JP] Japan .............................. 55-95196[U]

[51] Int. Cl.³ ............................................ G03B 7/16
[52] U.S. Cl. ...................................... 354/33; 354/128
[58] Field of Search ................ 354/33, 35, 60 F, 126, 354/127, 128, 133, 32

[56] References Cited

U.S. PATENT DOCUMENTS

| | | | |
|---|---|---|---|
| 4,100,554 | 7/1978 | Iijima | 354/145 |
| 4,130,356 | 12/1978 | Yamanaka | 354/145 |
| 4,135,797 | 1/1979 | Ohmura et al. | 354/128 |
| 4,140,379 | 2/1979 | Von Fischern | 354/32 |
| 4,153,355 | 5/1979 | Ikawa et al. | 354/145 |
| 4,174,898 | 11/1979 | Iijima | 354/145 |
| 4,261,658 | 4/1981 | Uchiyama et al. | 354/126 |

FOREIGN PATENT DOCUMENTS 54-27622 2/1979 Japan .

Primary Examiner—Russell E. Adams
Attorney, Agent, or Firm—Fitzpatrick, Cella, Harper & Scinto

[57] ABSTRACT

An improved operating device for a camera provided with a flash device which cooperates with the camera for flashlight photographing when the light emitting portion is brought to a position above the camera and suitable for flashlight photographing and with an operation device for bringing the light emitting portion to said position for flashlight photographing. The improved operation device comprises, a detecting circuit which produces an output when the brightness of the object is lower than a predetermined value; operation apparatus for receiving the output from the detecting circuit and bringing the light emitting portion to the position for flashlight photographing; and a detecting system for detecting the output voltage from a power source of the flash device and inhibiting said operation apparatus from operating when said detected source voltage is lower than the value necessary for flashlight photographing.

10 Claims, 5 Drawing Figures

POP UP FLASH DEVICE CONTROL FOR A CAMERA

BACKGROUND OF THE INVENTION

1. Field of the Invention

The present invention relates to a camera of the type which is provided with a flash device whose light emitting portion is received in the camera and which is prepared for flashlight photographing when the light emitting portion is popped up or protruded from the camera.

2. Description of the Prior Art

A camera provided with a flash device whose light emitting portion is received within the camera body or in the front part thereof is well known in the art. Before exposure, the brightness of an object to be taken at that time is measured. When the result of the measurement indicates the need for illuminating the object by the flash device, flashlight photographing is performed using the flash device. It is also known to provide the above mentioned type of camera with a mechanism for automatically popping up the light emitting portion to a position suitable for flashlight photographing. When the need for flashlight is detected, the mechanism is actuated to prepare the camera and its flash device for flashlight photographing. Such arrangement is disclosed, for example, in Japanese Application for Utility Model Patent laid open No. 27,622/1979.

However, the prior art technique involves some problems.

As a matter of course, the power source of the flash device is consumed with time and the source voltage may drop to a level insufficient for flashlight photographing. Even in such case, the pop-up mechanism according to the prior art is necessarily actuated so long as the brightness of the object is low. Therefore, although the source voltage in truth has dropped to a level insufficient for flashlight photographing, the light emitting portion is popped up, which will lead the operator erroneously to conclude that flashlight photographing is possible.

Another drawback of the prior arrangement disclosed in the aforementioned Japanese patent publication is found in that there is used a normally releasing type of electromagnet to control the pop-up of the light emitting portion. The light emitting portion of the flash device is normally locked in the position received in the camera. When the electromagnet is excited, it draws an unlocking member to allow the light emitting portion to pop out from the camera. Since a normally releasing type of electromagnet is used to draw the unlocking member which is normally apart from the magnet, a large amount of electric power is consumed to actuate the unlocking member.

SUMMARY OF THE INVENTION

Accordingly, it is a general object of the invention to improve the above mentioned type of camera which is provided with a flash device and which is prepared for flashlight photographing when the light emitting portion of the flash device is automatically popped up from the camera.

According to the invention, there is provided such arrangement which inhibits the light emitting portion from popping up when the source voltage has dropped to a level insufficient for flashlight photographing even if the brightness of the object is low.

In a preferred embodiment of the invention, a normally attracting type of electromagnet is used which enables substantial reduction in the consumption of electric power in the apparatus.

Other and further objects, features and advantages of the invention will appear more fully from the following detailed description taken in connection with the accompanying drawings.

DESCRIPTION OF PREFERRED EMBODIMENTS

Figure 1:
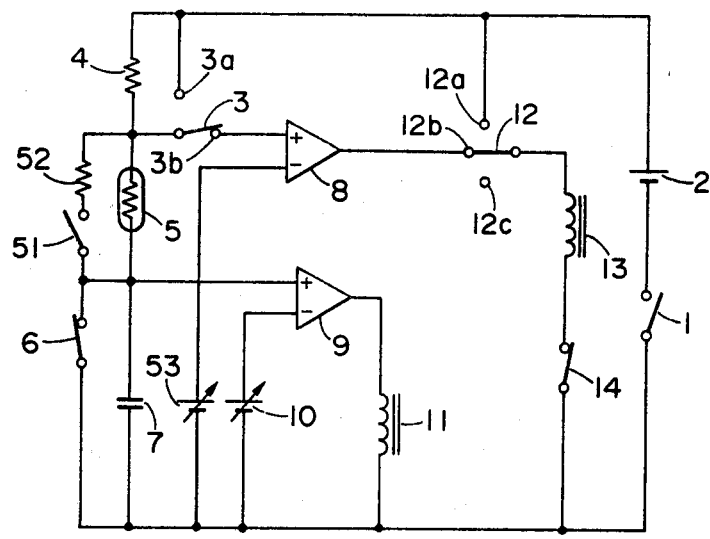
FIG. 1 shows a form of control circuit used in a preferred embodiment of the invention.

Referring first to FIG. 1 there is shown a control circuit for controlling the pop-up motion of the light emitting portion of a flash device as well as the exposure of the camera.

A power source switch 1 is connected with a power source 2. The source switch is so formed as to be closed in the first half of a stroke for pushing down the shutter releasing button of the camera. In link with a complete push-down of the shutter releasing button, a change-over switch 3 is switched over from terminal 3b to 3a.

A photo-electric element 5 is, in the shown embodiment, CdS. A resistance 4 is connected in series with the photo-electric element 5. Also, series connected with the element 5 is a switch 6 for controlling the discharge of a capacitor 7. The switch 6 is interlocked for closing with the wind-up motion of film and shutter of the camera and is interlocked for opening with a motion which takes place immediately before an exposure in connection with the shutter releasing operation. For example, the switch 6 is interlocked for opening with the start of running of the opening blade of the shutter.

Switches 14 and 51 are interlocked with the motion of a lever 29 shown in FIG. 2 and described hereinafter. 12 is a selection switch which is manually connected to any selected one of terminals 12a, 12b and 12c. 13 is a magnet provided to control the pop-up of the light emitting portion.

The magnet 13 has an iron core of permanent magnet and is formed in such manner that the attraction force of the permanent magnet is in force during the time that no current is being applied to its coil but the attraction force is cancelled by a magnetic force excited in the opposite direction to that of the permanent magnet when current is applied to the coil. Another magnet 11 serves to control the exposure time. When excited, the magnet 11 releases the closing blade of the shutter from locking means and allows the shutter closing blade to start running.

The manner of operation of the above described apparatus is as follows:

(1) Natural light photographing—when the brightness of object is sufficiently high:

The operator pushes down the shutter button. As soon as the shutter button is halfway down, the power source switch 1 shown in FIG. 1 is closed so that the voltage of the power source 2 is applied to the control circuit. In this position, switch 51 is opened and switch 6 is closed. Since the brightness of object is high, the intensity of the incident light upon the photo-electric element, CdS 5 is high. Therefore, the resistance of CdS 5 is reduced accordingly. Also, in this position, since the change-over switch 3 is in connection with terminal 3b, a divided voltage of the source voltage by the resistor 4 and the CdS 5 in the state of low resistance is applied to the non-inversion input of a comparator 8 which is receiving, at its other input, a voltage from a reference voltage source 53. Because of the low resistance of CdS 5, the divided voltage applied to the non-inversion input of the comparator 8 is lower than that of the reference voltage source. Therefore, the output from the comparator 8 is at a low level. Consequently, the magnet 13 is not excited and the attraction is in force although the selection switch 12 is in connection with terminal 12a and switch 14 is closed at that time.

Further pushing the shutter button down to the end of a full stroke causes the opening blade of the shutter to start running. Interlocked with the running of the shutter opening blade, the discharging switch 6 is opened and also the change-over switch 3 is switched over from terminal 3b to 3a, for example, in link with the complete push-down of the shutter button. Since the switch 3 is now connected to 3a, the timing capacitor 7 is charged through CdS 5. In a time corresponding to the resistance of CdS 5 which is in turn determined depending on the brightness of the object, the voltage charged on the capacitor 7 reaches the voltage level of the reference voltage source 10. At that time point, the output from a comparator 9 is turned to a High level to excite the shutter controlling magnet 11. Thus, the shutter closing blade starts running to perform an automatic exposure. After completing the exposure, the operator releases his hold of the shutter button. Thereby the source switch 1 is opened and the change-over switch 3 is switched over to 3b. In link with a motion for winding up the film, the discharging switch 6 is closed and the condenser is short-circuited. Therefore, the capacitor 7 is discharged and the apparatus is returned to its starting position ready for the next photographing.

(2) Flashlight photographing—when the brightness of object is low and the source voltage is sufficiently high:

Similarly to the above case (1), the source switch 1 is closed when the operator pushes down the shutter button to the middle of its stroke. However, since the brightness of object is low in this case, the CdS 5 is in the state of high resistance and therefore the input to the non-inversion input terminal of the comparator 8 is higher than that to the inversion terminal of the comparator. Consequently, the output from the comparator is at a High level. The magnet 13 is excited and its attraction force thereby becomes lost.

Figure 2:
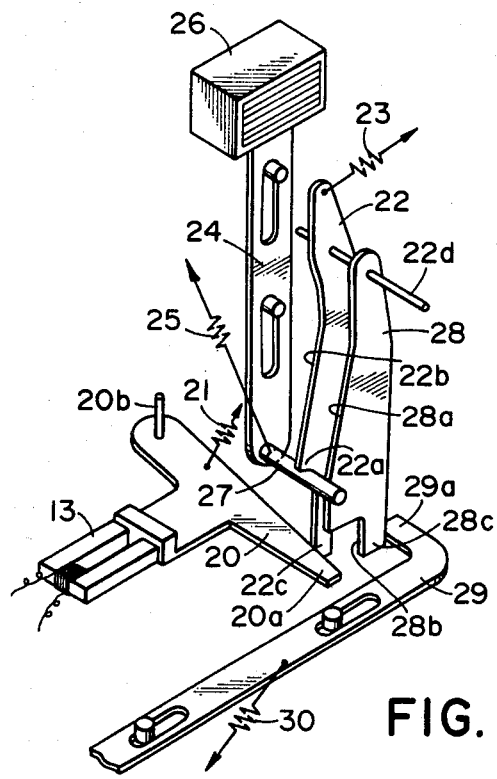
FIG. 2 is a perspective view of the mechanism for popping up the light emitting portion of the flash device to be controlled by the circuit shown in FIG. 1.
Figure 3:
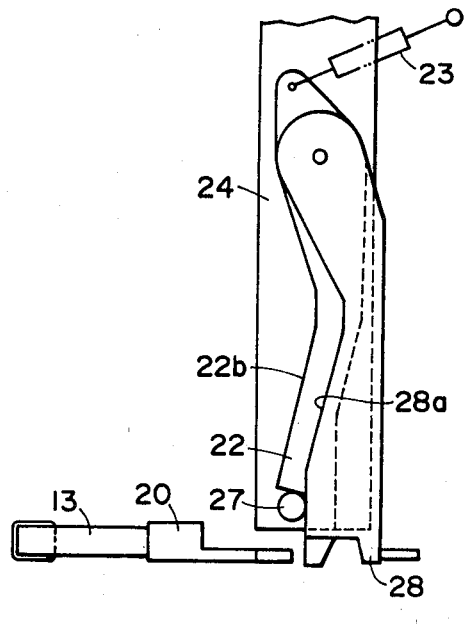
FIG. 3 is an enlarged view of the essential part of the pop-up mechanism, the light emitting portion being in the position received in the camera.
Figure 4:
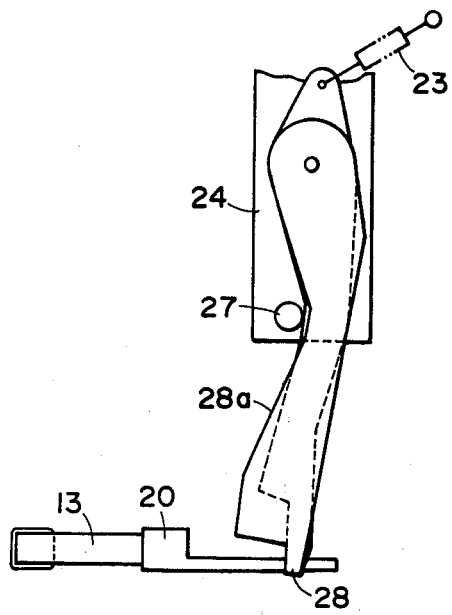
FIG. 4 is a view similar to FIG. 3 but showing the light emitting portion in the position popped up.

FIGS. 2 through 4 show a pop-up mechanism for a light emitting portion 26 to be driven by the control circuit shown in FIG. 1. In the position shown in FIGS. 2 and 3, the light emitting portion 26 is received within the camera and locked in that position. When the magnet 13 is excited and the attraction force acting on an iron lever 20 is removed under the condition described above, the lever 20 is rotated about a pivot 20b counter-clockwise, as viewed in the drawing of FIG. 2, by the biasing force of a spring 21. As the lever 20 rotates counter-clockwise, its free end portion 20a pushes against the lower portion 22c of a locking lever 22 so as to urge the latter to rotate counter-clockwise about a pin 22d. By this counter-clockwise rotation of the locking lever 22, a locking pin 27 is disengaged from the engaging portion 22a of the lever 22. As a result, a guide plate 24 is allowed to move upward under the biasing force of a spring 25. Thus, the light emitting portion 26 is popped up or protruded from the camera body. FIG. 4 shows the position of the pop-up mechanism after the light emitting portion 26 has popped out.

Since the locking pin 27 also moves upward together with the guide plate 24 during the above pop-up motion, a resetting lever 28 is allowed to rotate clockwise by a distance determined by a tapered cutout edge 28a of the lever 28. As the resetting lever 28 rotates clockwise, a switching lever 29 moves leftward, as viewed in the drawing of FIG. 2, under the action of a biasing spring 30. Interlocked with this movement of the lever 29, the switch 14 is opened to terminate excitation the magnet 13, and at the same time the switch 51 is closed. Also, the tapered edge 28b of the resetting lever 28 pushes the free end portion 20a of the iron lever 20 to rotate the latter clockwise as viewed on the drawing of FIG. 2. Thus, the iron level 20 is brought into contact with the magnet 13. Since, at this time, the magnet 13 has an attraction force resulting from the permanent magnet, the iron lever 20 is held in the position by the attraction of the magnet 13.

When the shutter button has been pushed down completely to the end of its stroke, the shutter opening blade starts running which causes the switch 6 to open and the change-over switch 3 turn over from terminal 3b to 3a. Since, as previously noted, the movement of the switching lever 29 has closed the switch 51, the capacitor 7 is charged through the parallel circuit composed of CdS 5 and resistor 52. As soon as the level of charged voltage on the capacitor 7 reaches the voltage level of the reference voltage source 53, the level of the output from comparator 9 becomes High and the shutter controlling magnet 11 is excited. This allows the closing blade of shutter to start running to complete an exposure.

In the case that the brightness of the object is high, the charge current to the capacitor 7 depends primarily upon the current flowing through CdS 5 which is low in resistance at that time. On the contrary, in the case that the brightness of the object is low and the resistance of CdS 5 is high, the capacitor 7 is charged primarily with the current flowing through the resistor 52. In this manner, the time required for charging the capacitor 7 up to the voltage level of the reference voltage source 10 can be set always within a determined length of time. Namely, the charging time never exceeds the determined limit.

The flash device including the light emitting portion 26 contains a capacitor known per se for storing flashing energy. The capacitor is precharged at the step of preparing the camera for taking a picture through suitable means such as a switch which is actuated at the preparing step. The flash device is so formed as to flash light only after it has been popped up and simultaneously with the excitation of the shutter controlling magnet 11. More particularly, in the first half course of the shutter button push-down movement, CdS 5 and comparator 8 detect that the prevailing brightness of the object at that time is low. In response to the detection, the light emitting portion 26 is popped up from the camera body in the manner described above. After popping up and at the completion of pushing down the shutter button over the remaining half course, the shutter controlling magnet 11 is excited to start the shutter closing blade running. In synchronism with the running of the shutter closing blade, the light emitting portion 26 flashes light. In this condition, however, it should be noted that for mechanical reasons there is some time lag from the excitation of the magnet 11 to the start of running of the shutter closing blade. Therefore, in practice, the shutter closing blade will start running after flashing of the light emitting portion 26.

After performing an exposure, the operator releases the shutter button and winds up the film. By this operation, the control circuit shown in FIG. 1 is automatically returned to its starting position in the manner described above. Push-down of the light emitting portion 26 after a flashlight photographing causes the locking pin 27 to move down along the sloped edges 22b and 28a of the locking lever 22 and the resetting lever 28 while rotating the levers 22 and 28 counter-clockwise. Finally, the locking pin 27 engages in the engaging portion 22a of the locking lever 22. Thus, the light emitting portion 26 is received in that camera body and held in the position. At this time, the rotation of the resetting lever 28 causes the switching lever 29 to slide rightward. In link with the movement of the switching lever, the switch 14 is closed and switch 51 is opened (this is the position shown in FIG. 1).

(3) Flashlight photographing—when the brightness of object is low and the source voltage has dropped:

When the brightness of object is low, the resistance value of CdS 5 is high. In this case, as described above, the level of output from the comparator 8 becomes High so long as the source voltage is sufficiently high. However, if the source voltage has dropped, then the input voltage to the non-inversion terminal of the comparator 8 that is a divided voltage from the source voltage, can not be higher than the voltage of the reference voltage source 53 however high the resistance of CdS 5 may be. The voltage level of the reference voltage 53 is so preset that when the source voltage has dropped to a level lower than the voltage level necessary for flashlight photographing, the divided input voltage to the non-inversion terminal of the comparator may never be higher than the reference voltage. Therefore, in this case, the output from the comparator 8 can not be High.

Since the output from the comparator 8 remains Low, the magnet 13 is not excited and therefore the light emitting portion 26 is not popped up. Also, switch 51 remains open. By completely pushing down the shutter button, the switch 3 is connected to the terminal 3a and the shutter opening blade starts running. Interlocked with the running of the opening blade, the switch 6 is opened and the capacitor 7 is charged through CdS 5. After the laps of a time determined in dependence upon the brightness of the object, the level of the output from the comparator 9 becomes High to excite the shutter controlling magnet 11. The shutter closing blade starts running to perform an automatically controlled exposure. After exposure, the pressure on the shutter button is removed and the film is wound up. In link with the motion, the control circuit shown in FIG. 1 is returned to its starting position.

In this manner, if the source voltage has dropped to a level at which flashlight photographing is no longer possible, the apparatus inhibits the operation of flashlight photographing even for an object of low brightness. Instead, photographing of such object is executed in accordance with the exposure control proper to natural light. Of course, in the case of natural light exposure control a relatively long exposure time is automatically set for an object of low brightness. Therefore, in this case, it is desirable that a signal be displayed within the finder of camera to inform the operator of an occurrence of unfavourable state or the shutter button be locked.

There may be also such case where the operator wishes to pop up the light emitting portion 26 and to carry out a flashlight photographing regardless of the brightness of the object and the drop of source voltage. In such case, the flashlight photographing is made possible by connecting the selection switch 12 to the terminal 12a. Since the switch 14 is closed, the pop-up controlling magnet 13 is excited to pop up the light emitting portion 26. Thus, the camera is brought into a position ready for flashlight photographing.

Also, it is possible to inhibit the excitation of the magnet 13 at all times independently of the brightness of the object. In this case, the selection switch 12 is connected to the terminal 12c so as to always allow natural light photographing.

Figure 5:
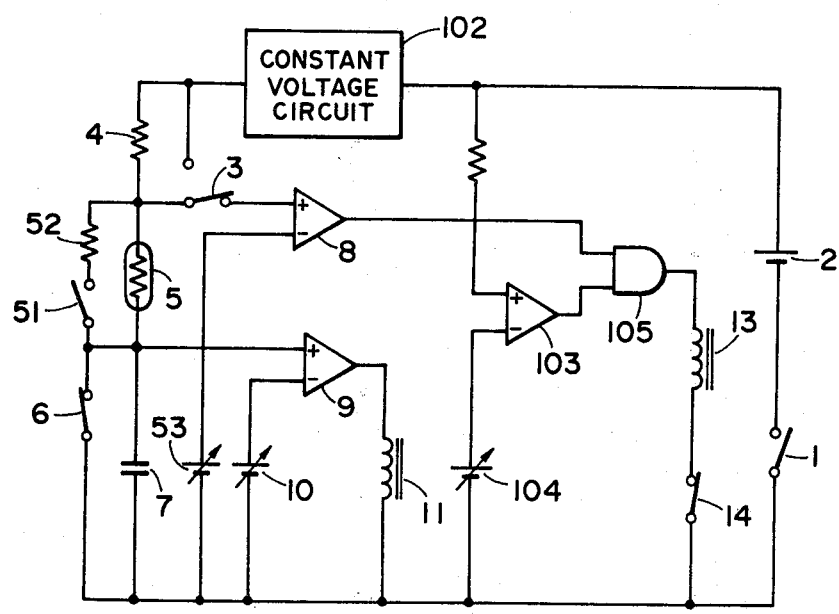
FIG. 5 shows another form of the control circuit according to the invention.

In the above embodiment, the voltage of the power source 2 has been shown to be directly applied to the circuit part composed of resistor 4, CdS 5 and capacitor 7 connected in series. However, as a modification of the embodiment, there may be provided a constant voltage circuit between the series connected circuit part and the power source 2. FIG. 5 shows such a modification as a second embodiment of the invention.

The control circuit shown in FIG. 5 includes a constant voltage circuit 102 interposed between the above said circuit part and the power source 2 so as always to apply to the circuit part a constant voltage. With this arrangement, the detecting circuit including comparator 8 and reference voltage source 53 serves to detect only the information relating to the brightness of the object. To detect whether the voltage of power source 2 is sufficient or not for operating the flash device, a separate detecting circuit is required. To this end, the control circuit shown in FIG. 5 includes additional comparator 103 and reference voltage source 104 connected between voltages sources so as to constitute a second detecting circuit. The comparator 103 has a High level output when the source voltage is sufficiently high. The output from the comparator 103 is applied to one input terminal of AND-gate 105 provided between the aforementioned comparator 8 and magnet 13. The AND-gate 105 produces an output of High level to excite the magnet 13 only when it receives High level output (the brightness of object is low) from the comparator 8 and High level output (the source voltage is sufficient) from the other comparator 103. In all other cases, AND-gate 105 produces an output of Low level and therefore the magnet 13 can not be excited.

While the invention has been particularly shown and described with reference to preferred embodiments thereof, it will be understood by those skilled in the art that the foregoing and other changes in form and details can be made therein without departing from the spirit and scope of the invention.

We claim:

1. A camera having a flash device provided with a light emitting portion which is movable between a first position in the camera and a second position protruded from the camera, and first biasing means for biasing said light emitting portion from the first position to the second position, the camera further comprising:
a latch member movable between a first position in which the latch member is capable of latching the light emitting portion in order to inhibit the light emitting portion from being moved from the first to the second position thereof by said biasing means when the light emitting portion is in the first position thereof, and a second position in which the light emitting means is released from the latch member;
second biasing means for biasing the latch member from the second to the first positions thereof;
an operating member movable between a first position in which the operating member can fix the latch member to the second position thereof while engaged with the latch member and a second position in which the operating member releases the latch member therefrom;
third biasing means for biasing said operating member from the second to the first position thereof;
holding means having a first state in which said operating member is held in the second position thereof and a second state in which said operating member is released; and
means for re-setting said operating member and said holding means to said second position and said first state, respectively, in response to movement of said light emitting portion from said first to second position.

2. A camera as set forth in claim 1, further comprising a detecting circuit for detecting the luminance value of light from the object to be photographed and producing a detecting signal when the luminance value is less than a predetermined value which is required to effect a proper exposure with respect to film charged in the camera, and wherein said flash device is capable of emitting flash light by the light emitting portion in association with the camera when the flash light emitting portion is in the second position; and said holding means when it is in the first state, changes to the second state in response to said detecting signal.

3. A camera as set forth in claim 2, wherein said camera further comprises a power source which can supply power to said flash device and means for detecting output voltage from the power source and inhibiting said detecting signal from being transmitted to said moving means when the output voltage from the power source is less than a predetermined value.

4. A camera as set forth in claim 3, characterized in that said detecting circuit includes a photo-electric conversion element whose resistance is variable depending upon the luminance value of the incident light upon said element whereas said inhibiting means includes a resistance circuit connected between said element and said power source, and said detecting circuit further comprising a comparator circuit for receiving, as an input, the voltage at the connection point between said element and said resistance circuit.

5. A camera as set forth in claim 3, characterized in that said detecting circuit includes a photo-electric conversion element whose resistance is variable depending on the luminance value of light incident on the element, a first resistance circuit connected between said element and said power source, and a first comparator circuit for receiving, as an input, voltage at the connecting point between said element and said first resistance circuit; and
said inhibiting means includes a second comparator circuit and a second resistance value circuit connected between an input terminal of said second comparator circuit and said power source.

6. A camera as set forth in claim 3, wherein said inhibiting means includes a gate circuit provided between said detecting circuit and said moving means and means for operating said gate circuit in accordance with the level of output voltage from said power source.

7. A camera as set forth in claim 1, wherein said resetting means includes a resetting member movable between a first position and a second position, fourth biasing means for biasing the resetting member from the first to the second position thereof, the resetting member being in its first position when the light emitting portion is in the first position, the resetting member being moved from its first position to its second position, in response to movement of the light emitting member from the first to the second position thereof, to reset said operating member and said holding means, and the resetting member being moved from its second position to its first position in response to movement of the light emitting portion from the second to the first position thereof.

8. A camera as set forth in claim 7, wherein said light emitting portion includes inhibiting means which engages said latch member in the first position of said light emitting portion so that the light emitting portion may be latched and engages said resetting member to inhibit the resetting member from moving to the second position thereof, the inhibiting means releasing the resetting means in response to movement of the light emitting portion from the first position to the second position thereof.

9. A camera as set forth in claim 8, wherein said flash device enables flash photography in cooperation with said camera by flash light generated by said light emitting portion when the light emitting portion is in its second position, and said camera further comprises control means having a first state in which exposure time is controlled for a proper exposure for effecting photography with no flash light and a second state in which exposure time is controlled for a proper exposure for effecting flash light photography with generation of flash light from the light emitting portion, and means for switching over said controlling means to the second state thereof in response to movement of the resetting member from the first to second position thereof, and the last mentioned means switching over said controlling means to the first state thereof in response to movement of the resetting member from the second to first position thereof.

10. A camera as set forth in claim 1, wherein said holding means includes an electromagnet and means for supplying electric current to said electromagnet, the electromagnet holding the operating member in the first position thereof when no electric current is supplied from the supply means to the electromagnet and the electromagnet releasing the operating member when electric current is supplied.

* * * * *